United States Patent [19]

Chung et al.

[11] Patent Number: 4,620,127
[45] Date of Patent: Oct. 28, 1986

[54] KINESCOPE-YOKE ASSEMBLY

[75] Inventors: Kwong T. Chung, Hopewell Township, Mercer County; Alfred R. Triano, Union County, both of N.J.

[73] Assignee: RCA Corporation, Princeton, N.J.

[21] Appl. No.: 705,649

[22] Filed: Feb. 26, 1985

[51] Int. Cl.⁴ .............................................. H01J 29/70
[52] U.S. Cl. .................................... 313/440; 524/786; 524/871; 358/248
[58] Field of Search ............... 524/786, 871; 313/440; 358/248

[56] References Cited

U.S. PATENT DOCUMENTS

| | | | |
|---|---|---|---|
| 4,000,103 | 12/1976 | Olstowski | 524/871 |
| 4,123,412 | 10/1978 | Fukuda et al. | 524/871 |
| 4,194,618 | 3/1980 | Malloy | 524/871 |
| 4,370,445 | 1/1983 | Depetris et al. | 524/871 |
| 4,383,070 | 5/1983 | Markusch et al. | 524/786 |
| 4,444,975 | 4/1984 | Pokorny | 528/49 |
| 4,490,645 | 12/1984 | Hamersma | 313/440 |

FOREIGN PATENT DOCUMENTS 47-23675  7/1972  Japan .................................. 524/871

Primary Examiner—Allan M. Lieberman

[57] ABSTRACT

An improved adhesive is disclosed for the automated assembly and alignment of kinescopes and yokes. The adhesive consists of a polymer matrix and a filler. The polymer matrix comprises an isocyanate component, a polyol component comprising one or more polyols having an average functionality greater than 2.0 and an average hydroxyl equivalent of from about 2000 to about 2500, a chain extender, a suitable catalyst and, optionally, other ingredients such as an antioxidant. The inorganic or organic filler comprises from about 32 to about 60 percent by volume of the adhesive. The subject adhesive is blended into a slow-curing and a fast-curing formulation, which are applied to a portion of the gap between the kinescope and the yoke. The fast-curing adhesive allows the completed assembly to be rapidly withdrawn from the assembly apparatus, or robot, and maintains the alignment during curing of the slower-curing adhesive. When both compositions are fully cured, there is produced an excellent, durable bond.

9 Claims, 1 Drawing Figure

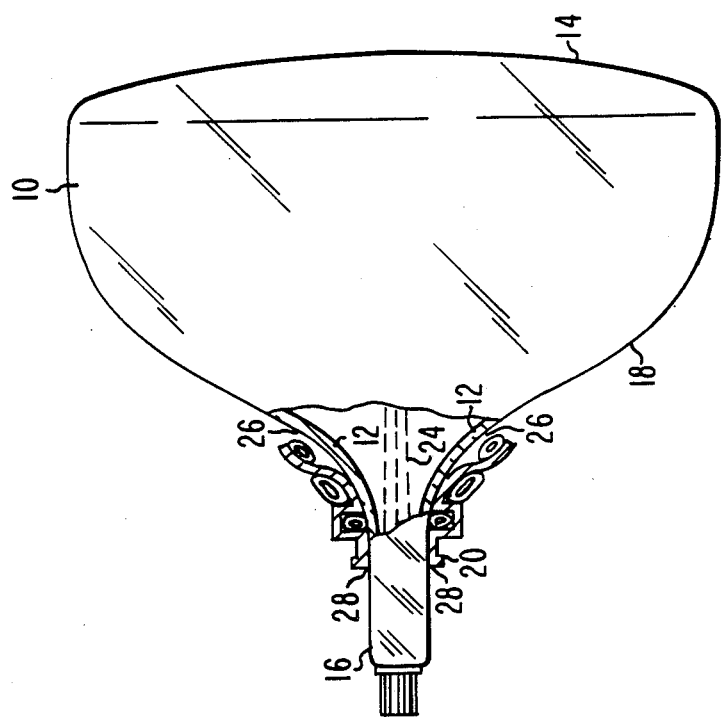

KINESCOPE-YOKE ASSEMBLY

This invention pertains to a kinescope-yoke assembly for a television receiver or video monitor bonded together with an improved adhesive.

BACKGROUND OF THE INVENTION

Automation and robotization of an assembly process in any industry is desirable for the improvement of productivity and for cost reduction. This is particularly true in a complex manufacturing process such as the manufacture of television receivers or video monitors. The present invention is concerned with the automation, in particular the robotization, of one step in this process, i.e. the assembly of the kinescope to the external magnetic deflection yoke (hereinafter "yoke").

In a television receiver or video monitor, the yoke, which is an assembly of coils, surrounds the neck portion of the kinescope, i.e. the cathode ray tube or picture tube. In the conventional method of assembling a yoke and kinescope, the yoke is positioned on the neck of the kinescope for maximum color purity and convergence and manually secured thereto with a clamp. The yoke is then tilted slightly with respect to the kinescope until maximum focusing is achieved and self-adhering rubber wedges are manually inserted between the yoke and the kinescope to maintain the correct tilt. These operations require about 0.75 man-hours to perform.

It is readily apparent that an adhesive which would permit the assembly and proper relative alignment of the kinescope and the yoke by an automated process, particularly utilizing robotics, would represent a significant advantage in cost and time savings as well as improving the uniformity and performance of the assembled display. There is, however, a substantial list of critical criteria which an adhesive must meet in order to facilitate robotizing of the kinescope/yoke assembly process.

First, the adhesive must have particular setting characteristics. A suitable adhesive cannot set instantly since that would not permit any final fine alignment of the kinescope relative to the yoke and would not permit transfer of the adhesive dispensing apparatus to the next assembly without clogging of the dispenser tubes. On the other hand, in order that the process can be cost effective, the adhesive must firmly set within about one minute so that the assembly apparatus, or robot, can release the assembly and rapidly engage the next.

A suitable adhesive must be compatible with and adhere well to the various materials to be contacted in the assembly, i.e. magnetic wires, a glass funnel, plastic casings and the like. A suitable adhesive must also maintain excellent dimensional stability so that the alignment of the parts will not change to the detriment of convergence and color purity in the final product. It is necessary that the adhesive not undergo more than a two percent change in dimension on curing or over the service life of the assembled receiver or monitor.

A suitable adhesive must be sufficiently thixotropic to maintain a uniform dispersion of the filler particles and, more importantly, to maintain the shape of the dispensed adhesive during curing in the space between the yoke and the kinescope which can vary between about 10 and 2000 mils.

In addition to the foregoing, a suitable adhesive must be fire-resistant, shock resistant to 35 g of impact which might be encountered in shipping; able to withstand thermal cycling of from −25° C. to 85° C., which is the possible operating temperature range of a television set, and be reasonable in cost. The adhesives provided in accordance with this invention meet all of these required criteria.

SUMMARY OF THE INVENTION

A kinescope and yoke are affixed with a polyurethane adhesive consisting of a polymer matrix and a suitable filler. The polymer matrix comprises: from about 40 to about 50 percent by weight of an isocyanate component, from about 40 to about 50 percent by weight of a polyol component comprising one or more polyols having an average functionality greater than 2.0 and an average hydroxyl equivalent of from about 2000 to about 2500; from about 2.8 to about 5 percent by weight of a suitable chain extender; from about 0 to 2.5 percent by weight of one or more suitable catalysts; and minor amounts of additives such as coloring agents, antioxidants and the like. The filler component comprises one or more inorganic or organic fillers which comprise from about 32 to about 60 percent by volume of the total adhesive formulation.

BRIEF DESCRIPTION OF THE DRAWING

The FIGURE is a plan view, in partial cross section, of a kinescope-yoke assembly.

DETAILED DESCRIPTION OF THE INVENTION

Referring to the FIGURE, there is shown a kinescope 10 comprising a glass envelope 12 having a faceplate or cap 14 and a tubular neck 16 connected by a funnel 18. The yoke 20 surrounds the neck 16 of the kinescope 10. The magnetic coils 22 in the yoke 20 subject the three electron beams 24 to magnetic fields thereby properly aligning them. The electron beams 24 are generated by an inline electron gun, not illustrated, in the neck 16 of the kinescope 10. Once the yoke 20 has been properly positioned so that the electron beams 24 are properly focused on a three-color phosphor screen on the faceplate 14, not illustrated, the subject adhesive is applied between the yoke 20 and the kinescope 10 at a predetermined number of spots around the circumference of the neck 16 at areas 26 and 28 to maintain the relative positions of the yoke 20 and the kinescope 10.

In accordance with this invention, a kinescope and a yoke are bonded by an adhesive comprising: a polymer matrix consisting of an isocyanate component, a polyol component, a suitable chain extender, one or more catalysts and optionally, minor amounts of additives such as antioxidants, coloring agents and the like; and an inorganic or organic filler.

The isocyanate component of the subject adhesives comprises one or more aliphatic or cycloaliphatic isocyanates containing at least two isocyanate groups. Suitable examples of this art-recognized group of compounds include: 2,4- or 2,6-toluene diisocyanate; diphenylmethane diisocyanate; 1,5-naphthalene diisocyanate; 1,6-hexamethylene diisocyanate; 4,6'-dicylohexylmethane diisocyanate; 4,6'-xylylene diisocyanate; isopherone diisocyanate; para-phenylene diisocyanate; 2,2,4- or 2,4,4-trimethylhexamethylene diisocyanate, cyclohexyl diisocyanate; 3,3'-tolidene-4,4'-diisocyanate; and 3,3'-dimethyl-diphenylmethane-4,4'-diisocyanate. The polymer matrix of the subject adhesives contains from about 40 to 50, preferably from about 45 to 48, percent by weight of the isocyanate component.

The polyol component of the polymer matrix is suitably comprised of one or more polyols having an average hydroxyl functionality, i.e. the number of hydroxyl groups per molecule, greater than 2.0 and preferably, at least about 2.5. The polyols particularly suitable in the subject adhesives have a high molecular weight, and, therefore, an average hydroxyl equivalent of from about 2000 to about 2500. The hydroxyl equivalent is calculated by dividing the molecular weight of a compound by the number of hydroxyl groups it contains. The polyol component is one or, preferably, a mixture of di-, tri- and tetra-polyols having the requisite functionality and molecular weight. Suitable representatives of this art-recognized class of compounds include diols such as tetramethylene glycol, ethylene diol or hexamethylene glycol; triols such as 1,1,1-trimethylol propane or 1,2,3-hexanetriol; tetrols such as erythritol or pentaerythritol; ether-type polyols which are adduct products of the above polyols with alkylene oxides having 2 to 5 carbon atoms, such as ethylene oxide, propylene oxide, isobutylene oxide and mixtures of such adducts; ester-type polyols which are condensation products of the above polyols with polycarboxylic acids such as glutaric, adipic or phthalic acids, caprolactone polyesters of the above polyols, and mixtures thereof. A particularly suitable polyol for the subject adhesives is a high molecular weight, ethylene oxide capped polymeric polyol available under the Trademark NIAX Polyol D-440 from the Union Carbide Company. The polymer matrix of the subject adhesives contains from about 40 to 50, preferably from about 40 to 45, percent by weight of the polyol component.

The chain extender of the subject adhesives is generally a low molecular weight diamine or aliphatic diol or triol. Typical diamine chain extenders include 3,3'-dichloro-4,4'-diaminophenylmethane, methylene diamine, m-phenylene diamine and the like. Typical diol chain extenders include ethylene diol, 1,4-butane diol, 1,1,1-trimethylol propane, and the like, with ethylene diol being preferred. The chain extender may comprise combinations of compounds from either group. The chain extender functions in the subject adhesives to aid the dimensional stability of the cured resin. The polymer matrix of the subject adhesives contains from about 2.8 to 5, preferably about 3.2 to about 4.5, percent by weight of the chain extender.

Although the chain extender component of an isocyanate/polyol composition such as described herein is frequently not counted in determining the average functionality ratio of the polyol, it is important in terms of the subject adhesives that the average functionality be greater than 2.0, preferably at least about 2.5. Therefore, when the chain extender is a diol, the polyol component must contain sufficient tri- and tetra-functional compounds so that the chain extender content does not bring the average functionality below the desired level.

The catalyst component of the subject adhesives comprises one or a mixture of compounds recognized as catalysts for isocyanate/hydroxyl reactions. Examples of suitable compounds include N,N,N',N'-tetramethylbutane diamine, triethylene diamine, dibutyl tin dilaurate, tin(II) octoate and the like. The polymer matrix of the subject adhesives contains from 0 to about 2.5, preferably from 0 to 0.25, or from 0.25 to 1.5, percent by weight of the catalyst component. The reason that the subject adhesives have two preferred ranges for the catalyst component will be detailed hereinafter.

The filler component of the subject adhesives comprises one or more finely divided particulate inorganic and/or organic substances such as alumina trihydrate, silica, antimony oxide, chlorinated or brominated polymers and the like. In general, it is preferred to use a combination of fillers which strengthens the bond, maintains dimensional stability of the adhesive when it is applied between the kinescope and the yoke and imparts thixotropy to the adhesive. This latter characteristic is important in maintaining the distribution of the filler particles and overall uniformity of the adhesive, as well as assuring a uniform cure time when isocyanate and polyol component compositions are mixed. The filler should also impart fire-retardance to the assembly. In general, the subject adhesives contain from about 50 to 75 percent by weight of one or more fillers. However, these percentages could vary considerably depending on the density of the fillers used. Therefore, it is more important that the filler particles comprise from about 32 to about 60, preferably from about 45 to about 50, percent by volume of the subject adhesives, regardless of the weight percent thereof. A preferred filler component comprises alumina trihydrate and fumed or colloidal silica in a volume ratio of about 15 to 1.

The subject adhesives may also contain conventional additives such as antioxidants, coloring agents and the like. Suitable antioxidants include, for example, phenols, phosphites, thioesters and amines. Suitable commercial antioxidants are hindered phenolic compounds such as tetrakis[methylene 3-(3',5'-di-tert-butyl-4'-hydroxyphenyl)propionate]methane, available under the tradename Irganox 1010 frm Ciba-Geigy, Inc. The total of such additives in the polymer matrix of the subject adhesives is typically not more than about 1 percent by weight, preferably from about 0.25 to 1 percent by weight.

The subject adhesives are prepared as two separate compositions, as is conventional. An isocyanate composition comprises the isocyanate component and a portion of the filler including a portion of the thixotrope. A polyol composition comprises the polyol component, the chain extender, the catalyst component, the remainder of the filler and other additives such as one or more antioxidants. The amount of filler in each composition may vary over a wide range depending on the thixotropy requirement and the requirement that there cannot be more filler in a given composition than can be readily wetted by the liquid ingredients therein. It is also preferred that the volume of the two compositions be approximately equal, regardless of whether there is a disparity in their weights. It is preferred to have a differentiating color additive in at least one of the compositions.

The subject adhesives are preferably formulated into three compositions, i.e. an isocyanate composition and two polyol compositions which differ principally in the amount of the catalyst they contain. The catalyst content in fast-curing and comparatively slow-curing polyol compositions is preferably from about 0.25 to 1.5 and from 0 to about 0.25 percent by weight, respectively, based on the weight of the polymer matrix. These compositions are dispensed in equipment having the capability to blend the isocyanate composition alternately with each polyol composition.

The fast-curing polyol composition, when mixed with the isocyanate composition, will cure in under one minute, preferably in about thirty seconds. The slower-curing polyol composition will produce a cured resin in under one hour, preferably in from about thirty to about sixty minutes. It is necessary that a sufficient bond strength be established by the curing of the first adhesive so that the assembly may be released within one minute in order that the automated process may be economically attractive. Subsequently, the blend of the isocyanate composition and the second polyol composition cures, thus completing the bond.

A second important function of the mixture of the isocyanate composition and the slower-curing polyol composition is that it purges the dispensing apparatus to prevent clogging by the fast-curing mixture. The dispensing apparatus is programmed so that a yoke/kinescope assembly receives several injections of the fast-curing mixture followed by one or more injections of the slower-curing mixture, all of which are spaced around the circumference of the gap 26 and 28 between the neck 16 of the kinescope 10 and the yoke 20. The slower-curing composition purges the dispenser of the fast-curing composition thereby preventing clogging. The adhesive may be applied either before or after the assembly has been aligned. It will be appreciated that the succeeding assembly will initially receive a small quantity of the slow-curing adhesive mixture during purging by the fast-curing adhesive mixture. This is in no way considered detrimental. When assembly is complete as described herein, the adhesive has formed what is conventionally referred to as a "green strength" cure. The yoke/kinescope assembly is then allowed to fully cure to maximum strength over about two days, thus forming an excellent, permanent bond which meets all of the criteria discussed above and which possesses exceptional shear strength and dimentional stability.

Although the assembly and curing operations described herein are suitably carried out under ambient conditions, the final curing of the adhesive may be carried out in a shorter period of time by raising the temperature somewhat, e.g. to about 60° to 100° C. At these temperatures, final curing may require only one to two hours.

The following Example further illustrates this invention, it being understood that the invention is in no way intended to be limited to the details described therein. In the Example, all parts and percentages are on a weight basis and all temperatures are in degrees Celsius, unless otherwise stated. cl EXAMPLE 1

Component compositions for a polyurethane adhesive were prepared by blending the following formulations:

| Ingredient | Parts |
| --- | --- |
| Isocyanate Composition | |
| 4,4'-Diphenylmethane diisocyanate | 92.2 |
| Alumina trihydrate | 79.0 |
| Fumed Silica | 3.0 |
| Total | 174.2 |
| Polyol Composition | |
| NIAX D-440 | 82.0 |
| Ethylene Glycol | 18.0 |
| Dibutyltin dilaurate | 1.5 |
| Triethylene diamine | 1.1 |
| Alumina Trihydrate | 144.0 |
| Fumed Silica | 1.0 |
| Color Pigment | 4.0 |
| Total | 251.6 |

The two compositions, mixed in the weight amounts given, were equal in volume. The adhesive formed by combining equal volumes of these compositions cured in thirty seconds. The functionality of the polyol composition was 2.8.

A similar composition containing only 0.1 part of dibutyltin dilaurate and triethylene diamine in the weight ratio of 4:3 cured in thirty minutes.

A sample of the mixture of the isocyanate composition and the first polyol composition was uniformly applied to a production kinescope and a production yoke brought in alignment therewith. The assembly was marked to reference alignment and focus and held in place for thirty seconds. The bond produced surpassed minimum requirements for commercial television receivers in thermal stability, shock resistance, fire retardance and adherance. The dimensional stability of the bond, i.e. the deviation from alignment and focus, caused by curing of the adhesive, was 1.2 percent.

CONTROL

The fast-curing mixture of Example 1 was compared with two commercial adhesive preparations recommended for similar applications, i.e. Tyrite of Lord Chemical Co. and Pliogrip by Goodyear Chemicals, Inc. The chemical makeup of these preparations is not known with certainty. These compositions were applied and cured in accordance with the manufacturer's instructions.

The shrinkage of all three compositions on a glass substrate was determined. The force required to separate a coating of each composition from a glass substrate and a wire substrate were also determined. A device made by Instron Textile Equipment was utilized to determine the strength of the bonds. The results are reported in the following Table. In each instance, it was attempted to pull the coating from the substrate. Because the area of the wire was known with certainty, the results for the wire are expressed in pounds per square inch. In contrast, the results for the glass rod are expressed only in pounds of pull force exerted.

TABLE

| Adhesive | Shrinkage | Glass (Pounds) | Wire (psi) |
| --- | --- | --- | --- |
| Tyrite | 2.5 percent | 7.7 | 2210 |
| Pliogrip | 2.9 percent | 3.4 | 1900 |
| Example 1 | 1.2 percent | 14.6 | >3000 |

In the wire test with the composition of Example 1, the wire broke at a pull force of 3000 pounds per square inch leaving the coating intact.

The superior bond provided by the subject adhesives is clearly demonstrated by these results.

We claim:

1. An assembly comprising a kinescope and an external magnetic deflection yoke bonded thereto with an adhesive comprising: a polymer matrix comprising from about 40 to about 50 percent by weight of an isocyanate component, from about 40 to about 50 percent by weight of a polyol component comprising one or more polyols having an average functionality greater than 2.0 and an average hydroxyl equivalent of from about 2000 to about 2500, from about 2.8 to about 5 percent by weight of a suitable chain extender, from 0 to about 2.5 percent by weight of one or more catalysts for isocyanate/hydroxyl reactions; and one or more suitable fillers selected from the group consisting of inorganic fillers, organic fillers and mixtures thereof, said fillers comprising from about 32 to about 60 percent by volume of the adhesive, with the proviso that when the claim extender is a diol the functionality thereof is included in said polyol component functionality average.

2. An assembly in accordance with claim 1, wherein the polymer matrix comprises from about 45 to about 48 percent by weight of the isocyanate component, from about 40 to about 45 percent by weight of the polyol component, and from about 3.2 to about 4.5 percent by weight of the chain extender; and the filler comprises from about 45 to about 50 percent by volume of the adhesive.

3. An assembly in accordance with claim 1, wherein the chain extender is ethylene diol.

4. An assembly in accordance with claim 1, wherein the average functionality of the polyol component is at least about 2.5.

5. An assembly in accordance with claim 1, wherein the isocyanate is 4,4'-diphenylmethane diisocyanate.

6. An assembly in accordance with claim 1, wherein the catalyst is a mixture of dibutyltin dilaurate and triethylene diamine.

7. An assembly in accordance with claim 1, wherein two fillers are present and one of said fillers imparts thixotropy to the adhesive.

8. An assembly in accordance with claim 7, wherein the thixotropic filler is fumed silica.

9. An assembly in accordance with claim 8, wherein the filler comprises alumina trihydrate and fumed silica in a 15:1 ratio by volume.

* * * * *